United States Patent
Natanzon et al.

(10) Patent No.: US 9,875,042 B1
(45) Date of Patent: Jan. 23, 2018

(54) ASYNCHRONOUS REPLICATION

(71) Applicant: EMC Corporation, Hopkinton, MA (US)

(72) Inventors: Assaf Natanzon, Tel Aviv (IL); Leehod Baruch, Rishon Leziyon (IL); Jehuda Shemer, Kfar Saba (IL); Saar Cohen, Moshav (IL); Slavik Neymer, Petah Tikva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/674,265

(22) Filed: Mar. 31, 2015

(51) Int. Cl.
*G06F 3/06* (2006.01)
*G06F 11/20* (2006.01)

(52) U.S. Cl.
CPC ............ *G06F 3/0619* (2013.01); *G06F 3/067* (2013.01); *G06F 3/0665* (2013.01); *G06F 11/2074* (2013.01)

(58) Field of Classification Search
None
See application file for complete search history.

(56) References Cited

U.S. PATENT DOCUMENTS

| | | | | |
|---|---|---|---|---|
| 5,799,141 A * | 8/1998 | Galipeau | ............. | G06F 11/2094 707/999.008 |
| 7,188,292 B2 * | 3/2007 | Cordina | ................... | H04L 49/90 710/33 |
| 7,984,327 B2 * | 7/2011 | Winokur | ............. | G06F 11/2082 710/104 |
| 8,103,937 B1 * | 1/2012 | Natanzon | ............. | G06F 11/2064 711/150 |
| 8,335,771 B1 * | 12/2012 | Natanzon | .......... | G06F 17/30008 707/684 |
| 8,429,362 B1 * | 4/2013 | Natanzon | ............. | G06F 11/1471 711/161 |
| 8,543,609 B1 * | 9/2013 | Natanzon | .............. | G06F 3/0605 707/791 |
| 8,583,852 B1 * | 11/2013 | Mahajan | ............. | G06F 9/45558 711/161 |
| 8,694,700 B1 * | 4/2014 | Natanzon | .................. | G06F 5/00 709/233 |
| 9,063,994 B1 * | 6/2015 | Natanzon | .......... | G06F 17/30575 |
| 9,251,010 B2 * | 2/2016 | Hochberg | ............... | G06F 3/065 |
| 9,405,765 B1 * | 8/2016 | Natanzon | .......... | G06F 17/30174 |
| 2004/0083245 A1 * | 4/2004 | Beeler, Jr. | ............ | G06F 11/2071 |
| 2007/0079088 A1 * | 4/2007 | Deguchi | ............... | G06F 1/3203 711/162 |
| 2008/0082770 A1 * | 4/2008 | Ahal | .................... | G06F 11/1471 711/162 |
| 2008/0104443 A1 * | 5/2008 | Akutsu | ............... | G06F 11/2058 714/6.12 |
| 2009/0216969 A1 * | 8/2009 | Winokur | ............. | G06F 11/1441 711/162 |
| 2009/0287967 A1 * | 11/2009 | Winokur | ............. | G06F 11/1443 714/54 |

* cited by examiner

*Primary Examiner* — Nathan Sadler
(74) *Attorney, Agent, or Firm* — Krishnendu Gupta; Konrad R. Lee

(57) ABSTRACT

A method, system, and computer program product for use in a replication environment comprising intercepting an IO sent from a host to a storage device in a splitter, marking information about the IO in a tracking structure, sending the IO to the storage device, and sending the IO to a replication device; wherein the IO is sent to the storage device before confirming that the replication device has received the IO.

17 Claims, 17 Drawing Sheets

ASYNCHRONOUS REPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

This Application is related to U.S. patent application Ser. No. 14/674,241 entitled "CONSISTENCY DETERMINATION" and Ser. No. 14/674,708 entitled "REPLICATION ORDERING".

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations may afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site may recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and computer program product for use in a replication environment comprising intercepting an IO sent from a host to a storage device in a splitter, marking information about the IO in a tracking structure, sending the IO to the storage device, and sending the IO to a replication device; wherein the IO is sent to the storage device before confirming that the replication device has received the IO.

BRIEF DESCRIPTION OF THE DRAWINGS

The present invention will be more fully understood and appreciated from the following detailed description, taken in conjunction with the drawings in which.

DETAILED DESCRIPTION

Figure 1:
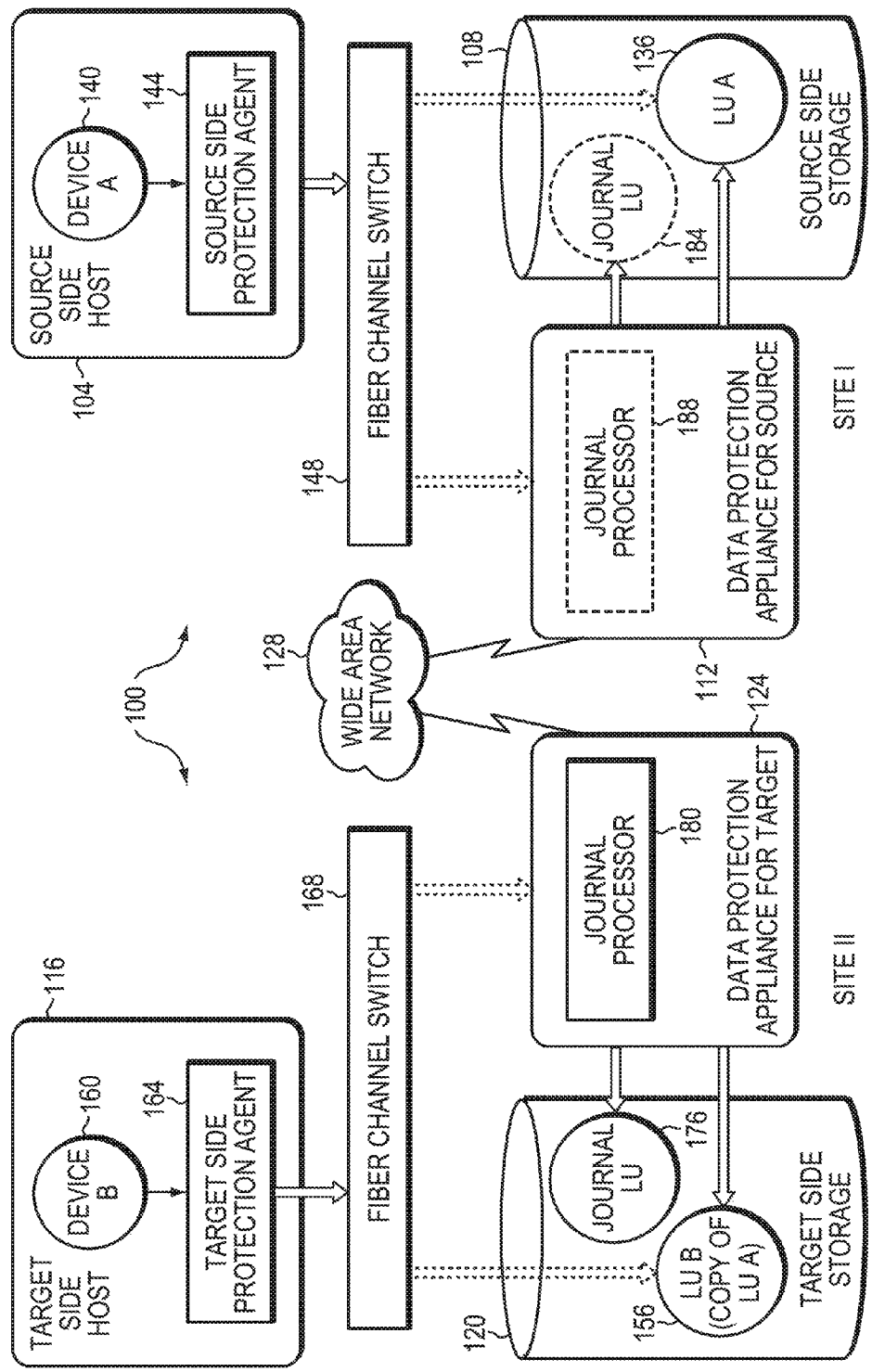
FIG. 1 is a simplified illustration of a data protection system, in accordance with an embodiment of the present disclosure.

Typically, in a replication environment it is possible to recover from a failure of a single component of the replication system without having to perform a synchronization of a production volume and the replica volume. Generally, a full synchronization of a production and volume may take a lot of time (i.e. days in case of large volumes) during which time replication may not be active. Typically, replication requires acknowledgement from a protection or replication appliance before IO may be sent down an IO stack so that after a failure there will not be a requirement for a complete sweep or synchronization of the production and replication data.

In many embodiments, the current disclosure may enable asynchronous replication that does not require an acknowledgement from a protection appliance before an acknowledgement is sent back to an IO source such as a host in virtual environments. In certain embodiments a backlog in a splitter may track IO that has occurred. In other embodiments, a delta marker in a replication appliance may track IO that occurred.

In many embodiments of the current disclosure, to survive a component failure without full synchronization, meta-data (offset and length) of write IOs that passed through a replication system to a production device and were not written to a replica device may be recoded. In other embodiments, IO written may be tracked in a map. In certain embodiments, in a case of failure the system may use a backlog and may perform a short synchronization of the "dirty regions" to recover from the failure and return to active replication. In some embodiments, a backlog may exist in a splitter. In many embodiments, a delta marker may exist in a replication protection appliance (RPA). In most embodiments, IO split may be tracked in a splitter, may be tracked in a storage array, and may be tracked in an RPA. In many embodiments, when a splitter receives an IO, it may send the IO to storage and an RPA. In other embodiments, when storage completes an IO, a splitter may acknowledge the completion to a host. In most embodiments, if a crash occurs in one of the members of a replication environment, it may be possible to determine what IO has been split but not replicated based on the devices that did not crash. In most embodiments, the ability to determine what IO has been split but not replicated may avoid having to do a full resynchronization of the replicated data. In certain embodiments, a splitter may be in a virtual host an enabled to track IOs at a storage layer. In most embodiments, a splitter may have metadata tracking replicated IO in addition to storage having metadata tracking replicated IO.

In some embodiments, a replication environment may replicate virtual environments. In certain embodiments, in a virtualized environment, a storage array may not be able to track replicated IO in the same way as a splitter, due to differences in how IO is tracked inside a virtual environment, where the splitter may exist, and outside the virtual environment, where a storage array may exist. In some embodiments, metadata in a virtual splitter may not be the same metadata as stored on a storage array. In certain embodiments, a splitter may add additional metadata to split IO to enable the storage array to track IO written to a storage array with the same metadata as the splitter. In other embodiments, a map may be created to map IO marked as replicated on storage to IO replicated in a virtual environment. In many embodiments, storage may not have insight into where IO is stored for a particular virtual disk on the storage, as the virtual disks may be stored together as files on a LU.

In some embodiments, marking of IO may be kept both in a splitter and on a replication appliance. In many embodiments, when a host performs a write IO, the IO may intercepted by a splitter. In certain embodiments, a splitter may mark IO and IO metadata in a backlog. In certain embodiments, IO may be sent to a RPA and marked in the RPA's in-memory backlog before it is acknowledged back to the splitter. In some embodiments, after a write IO is acknowledged, the IO may be sent to a production device.

In many embodiments, if replication needs to wait for an acknowledgement from a replication appliance before IO is acknowledged to a host, this methodology may not be truly asynchronous replication. In many embodiments, if a replication needs to wait for an acknowledgement from a replication appliance before IO is acknowledged to a host synchronous replication to a RPA (which typically resides on a datacenter) may occur, but write IOs may be delayed due to the extra hop to the RPA appliance before the IO may be written to the production device. In certain embodiments, an acknowledgement may slow the application and may be measured as the added response time of a replication product. In certain embodiments, measurement of a RPA delay may impact replication production quality.

In some embodiments, split IO meta data that may not have been replicated may be recorded in a virtual environment in two layers along the IO flow from a virtual host sending the IO and a datastore recording the IO. In certain embodiments, each layer may be stored on a different physical device. In many embodiments, storing split IO meta data on different layers may enable asynchronous replication by eliminating the need for acknowledgement from a replication device before acknowledging IO to a host. In certain embodiments, if one of the layers fails or crashes, replicated IO may be reconstructed from another layer. In some embodiments, the current disclosure may allow truly asynchronous replication as there may not be an extra hop to an external appliance before an IO is sent to a production device. In some embodiments, removing the requirement for an acknowledgement may reduce the added response time of the replication.

In certain embodiments, a splitter may be placed in a hypervisor or an ESX host. In some embodiments, a splitter in a virtualized environment may intercept writes or IOs written to virtual storage, such as a VMDK, that may be exposed to a virtual machine and the splitter may mark the IO in a backlog. In many embodiments, a data storage device that stores the virtual storage of the virtual machine may include a backlog of the IO written by the VM.

In certain embodiments, a splitter, such as a splitter placed in an ESX, may perform splitting of the IO to a replication appliance in parallel or after the IO is sent to underlying storage. In some embodiments, a replication appliance backlog may be needed if a portion of a virtual environment fails, such as an ESX failure, in between splitting of IO to a replication appliance and writing the IO to an underlying volume.

In some embodiments, a splitter in a virtualized environment, such as an ESX host splitter, may be aware of an offset inside a virtual machine disk file, such as a VMDK, stored on storage outside of the virtualized environment. In certain embodiments, a storage component tracking IO and storing a virtual machine disk file, such as a VMDK, may not have knowledge of the offset of the virtual machine disk file which may be stored in a LU (device) containing multiple virtual machine disks. In many embodiments, a mapping to the virtual machine disk from a LU containing the virtual machine disk may be performed by a VMFS file system, which may not be known to a storage device storing the virtual machine disks for virtual machines.

In a particular embodiment, a splitter, such as an ESX splitter, may add information about the offset of the IO in the VMDK to split write IO. In many embodiments, additional information about an IO offset added to a split write IO may be intercepted by a backlog component on a storage array. In most embodiments, IO intercepted on a storage array may be marked in an IO backlog on the array. In certain embodiments, if a hypervisor were to fail, such as an ESX host failure, another hypervisor, such as an ESX host, in a cluster of hypervisors that may run the replicated virtual machines, may be able to rebuild the backlog by communicating with an array backlog component. In certain embodiments, a storage array may use IO intercepted to map the IO back to a particular virtual disk associated with a virtual machine.

In a first embodiment, a splitter may encapsulate extra metadata with each IO to the backend storage and the extra metadata may indicate to the storage to which virtual disk the IO belongs to and which offset. In this embodiment, dirty locations may be fetched from the storage using a vendor specific SCSI command, which may return the dirty location in a specific VMDK In a second embodiment, a splitter may not send extra metadata to storage and the storage may track the offsets dirty in the LU containing the virtual disk. In this embodiment, to get dirty locations a vendor specific SCSI command may be used, which may return the list of dirty locations in the LU. In this embodiment, a VMFS in the LU may be parsed and the locations which are both dirty and are mapped as part of the VMDK file may be marked as dirty In some embodiments, rebuilding a hypervisor backlog may occur in the case of a hypervisor failure. In most embodiments, failure of a component other than a hypervisor may cause a short synchronization based on the ESX host backlog.

The following may be helpful in understanding the specification and claims:

BACKUP SITE—may be a facility where replicated production site data is stored; the backup site may be located in a remote site or at the same location as the production site; a backup site may be a virtual or physical site CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA. A RPA or DPA may also be referred to herein as a replication appliance or a protection appliance.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more disk, virtual disks or virtual LUNs, which may correspond to one or more Virtual Machines. LUN may be used interchangeably with LU herein.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site WAN—may be a wide area network that connects local networks and enables them to communicate with one another, such as the Internet.

SPLITTER/PROTECTION AGENT: may be an agent running either on a production host a switch, a storage array, a virtual machine, hypervisor, or other portion of an IO path, which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines.

VIRTUAL VOLUME: may be a volume which is exposed to host by a virtualization layer, the virtual volume may be spanned across more than one site and or volumes VASA: may be a set of vCenter providers that allow an administrator to manage storage Virtualization filter appliance (VFA): may be a layer in the hypervisor that has the ability intercepts and split IO from a VM being written to a virtual disk. In some embodiments, the VFA may be running on a VM in a hypervisor This is an out of mechanism that allows storage management over web based APIs.

VVOL-filter—may be a VM utilizing a specialized Virtual machine, which may provide an infrastructure that allows for introducing a "device driver" into the virtualized IO stack provided by the Virtual machine Virtual RPA (vRPA)/Virtual DPA (vDPA): may be a data protection appliance (DPA), which also may be referred to herein as a replication protection appliance, running in a VM or a hypervisor.

VASA may be vSphere Storage application program interfaces (APIs) for Storage Awareness.

DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

A discussion of journal based replication may be integrated with a virtual service layer. may be found in U.S. patent application Ser. Nos. 13/077,256, and 13/077,262 entitled "CONSISTENT REPLICATION IN A GEOGRAPHICALLY DISPERSE ACTIVE ENVIRONMENT," "INVERSE STAR REPLICATION," and U.S. Pat. No. 9,063,994 entitled "NETWORKED BASED REPLICATION OF DISTRIBUTED VOLUMES," respectively, filed on Dec. 16, 2010 assigned to EMC Corp., which is hereby incorporated by reference.

A discussion of virtual replication may be may be found in allowed U.S. patent application Ser. No. 13/599,492, entitled "MULTI SITE AND MULTI TENANCY," filed on Aug. 30, 2012 assigned to EMC Corp., which is hereby incorporated by reference.

Embodiment of a Replication System

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time. FIG. 1 illustrates wide area network 128, LU A 136, Fiber Channel Switch 148, LU B (Copy of LU A) 156, Fiber Channel Switch 168, Journal LU 184, and Journal Processor 188.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (splitter) may run on the host, or on the storage, or in the network, and that DPAs are optional and DPA code may run on the storage array too.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system or on the storage system itself.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal.

Figure 2:
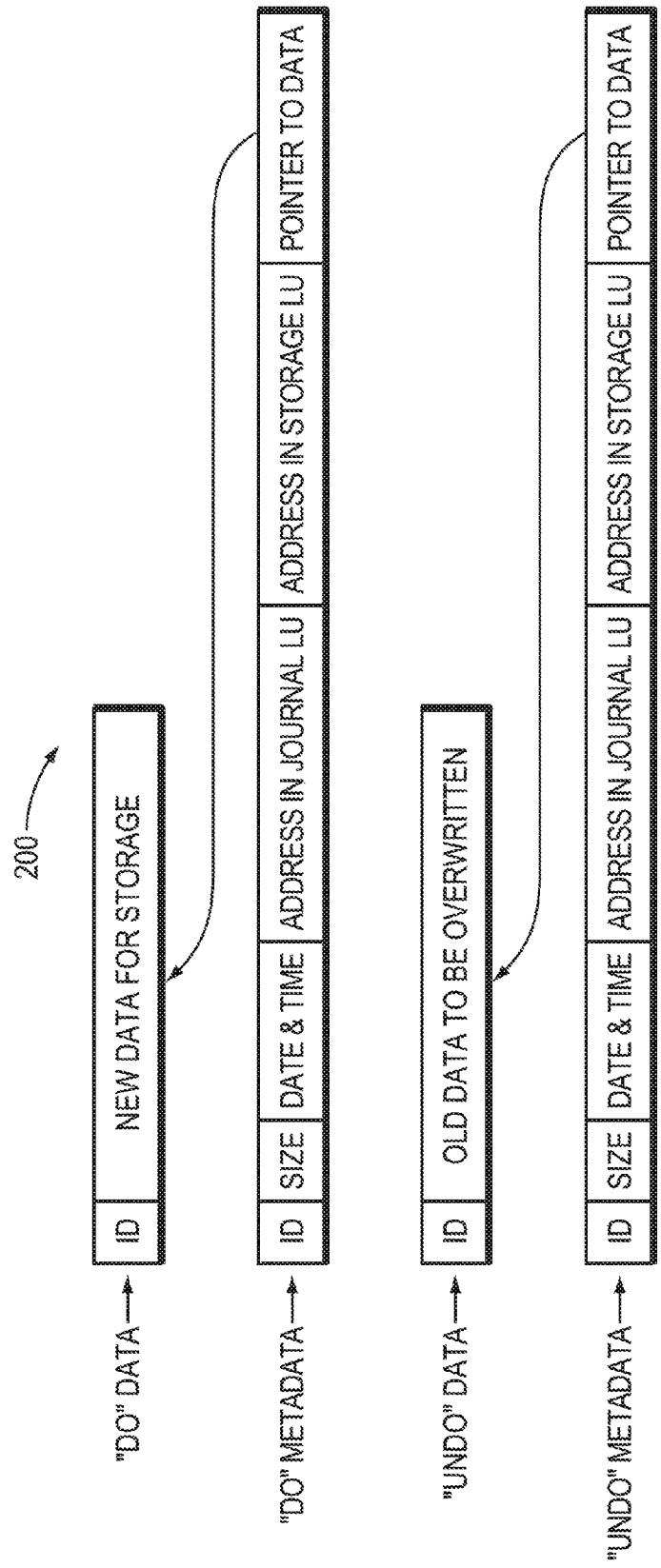
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
  one or more identifiers;
  a time stamp, which is the date & time at which the transaction was received by source side DPA 112;
  a write size, which is the size of the data block;
  a location in journal LU 176 where the data is entered;
  a location in LU B where the data is to be written; and the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

Asynchronous Data Replication

Figure 3:
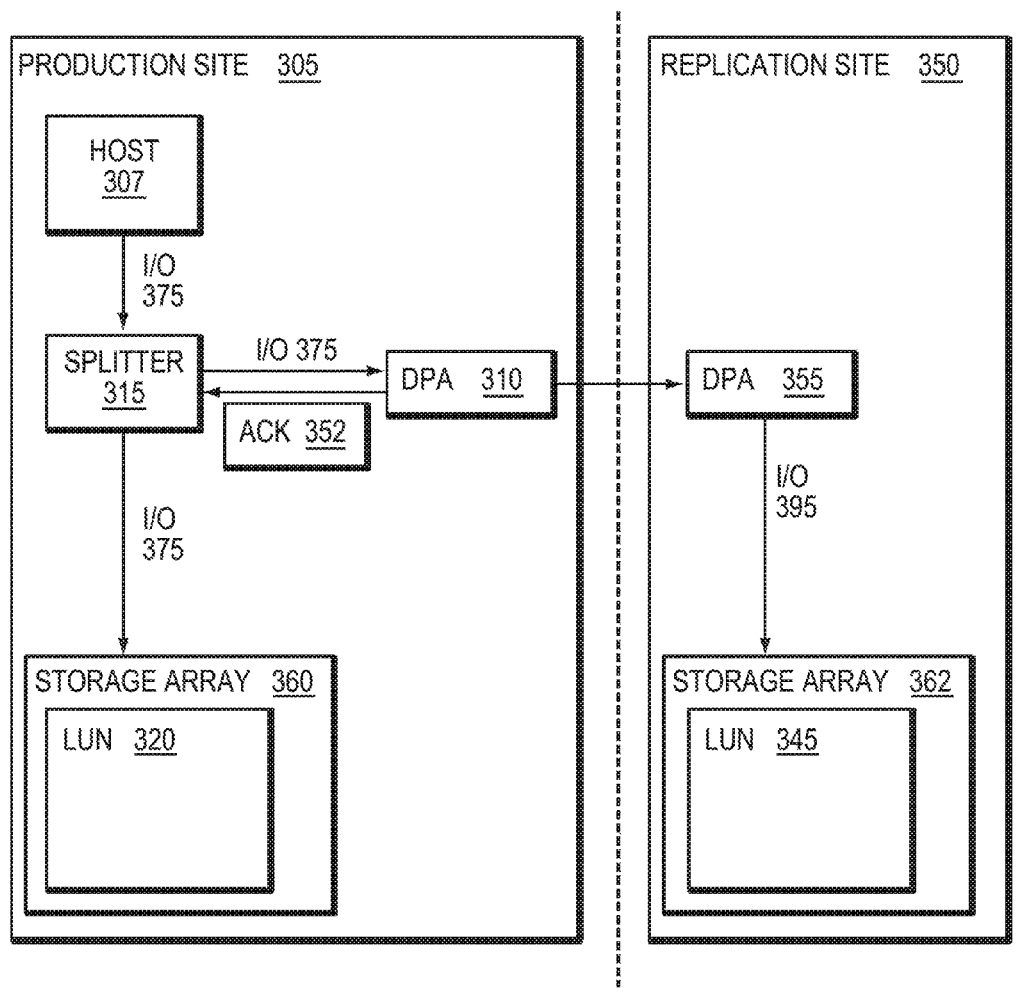
FIG. 3 is an alternative simplified illustration of a data protection system, in accordance with an embodiment of the present disclosure.
Figure 4:
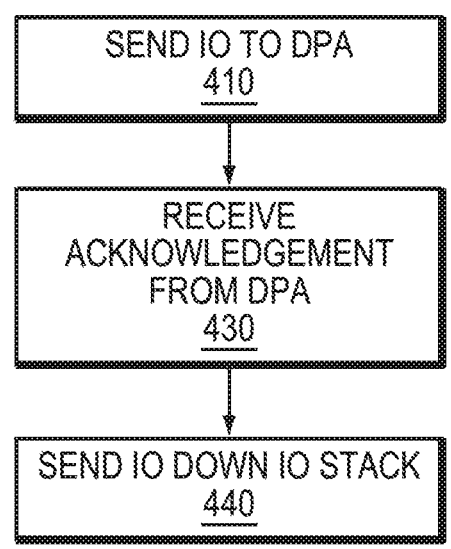
FIG. 4 is a simplified example of a method for data replication, in accordance with an embodiment of the present disclosure.

Refer now to the embodiments of FIGS. 3 and 4. Splitter 315 receives IO 375 from Host 307. Splitter 315 sends IO 375 to DPA 310 (step 410). DPA 310 sends acknowledgement 352 to splitter 315 (step 430). Splitter 315 sends IO 375 to Storage array 360 (step 440). FIG. 3 illustrates Production Site 305, LUN 320, LUN 345, Replication site 350, DPA 355, Storage array 362, and I/O 395.

In further embodiments, when in asynchronous data replication mode, there may be an increased chance of data loss. In some embodiments, data loss may occur as the acknowledgement of receipt of an I/O has been logged, before the I/O may be written to a DPA. In further embodiments, if there is a crash between the acknowledgement and when the I/O is written, this data may be lost. In some embodiments, asynchronous data replication may be useful when latency does not allow synchronous replication or when some small amount of data loss is allowed.

In alternative embodiments, asynchronous data replication may offer the ability to run the production site with little or no slowing due to data protection requirements. This may be because replication requirements, in terms of data needed to be replicated, may not be constant and may fluctuate. Asynchronous data replication may offer a buffer or lag which may buffer data replication, allowing it to build up during heavy replication periods and allowing it to catch up during lighter replication periods.

Asynchronous Replication without Acknowledgement

Figure 5:
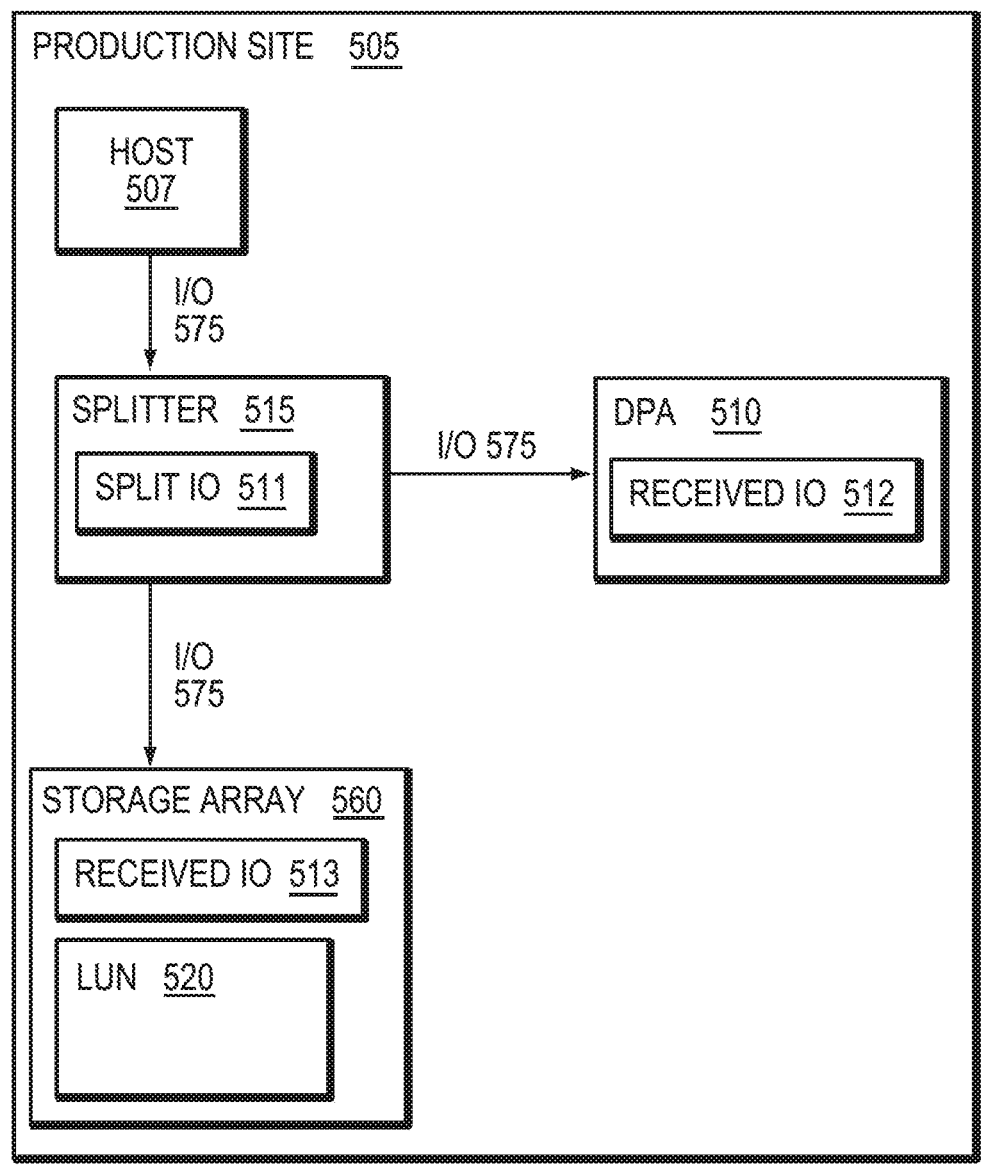
FIG. 5 is an alternative simplified illustration of a data protection system, in accordance with an embodiment of the present disclosure.
Figure 6:
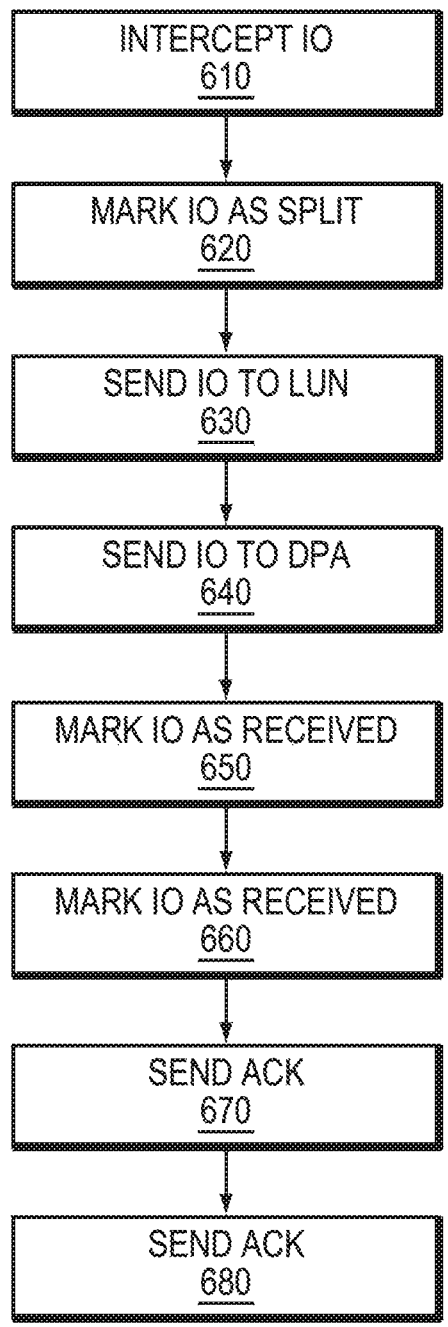
FIG. 6 is a simplified example of a method for data replication without waiting for acknowledgement from a replication appliance, in accordance with an embodiment of the present disclosure.

Refer now to the example embodiment of FIGS. 5 and 6. In these embodiments, production site 505 has host 507, DPA 510, Splitter 515 and LUN 520. Host 507 sends IO 575 which is intercepted by splitter 515 (step 610). Splitter 515 splits IO 575 marking that the IO has been split in Split IO 515 (step 620). Splitter 515 sends IO 575 to LUN 520 (step 630). Splitter 515 sends IO 575 to DPA 510 (step 640). Storage 560 marks IO 575 as received in received IO 513 (step 650). (In other embodiments a backlog manager may run on storage or a storage any to mark received IO). DPA 510 marks IO 575 as received in received IO 512 (step 660). Storage 560 sends an acknowledgement to splitter 515 that IO completed to LUN 520 (step 670). Splitter 515 sends acknowledgement to host 507 in this embodiment acknowledgement 680 may return before acknowledgement 670 has returned (step 680). FIG. 5 illustrates Split IO 511, Received IO 512, Received IO 513, and Storage array 560.

Figure 7:
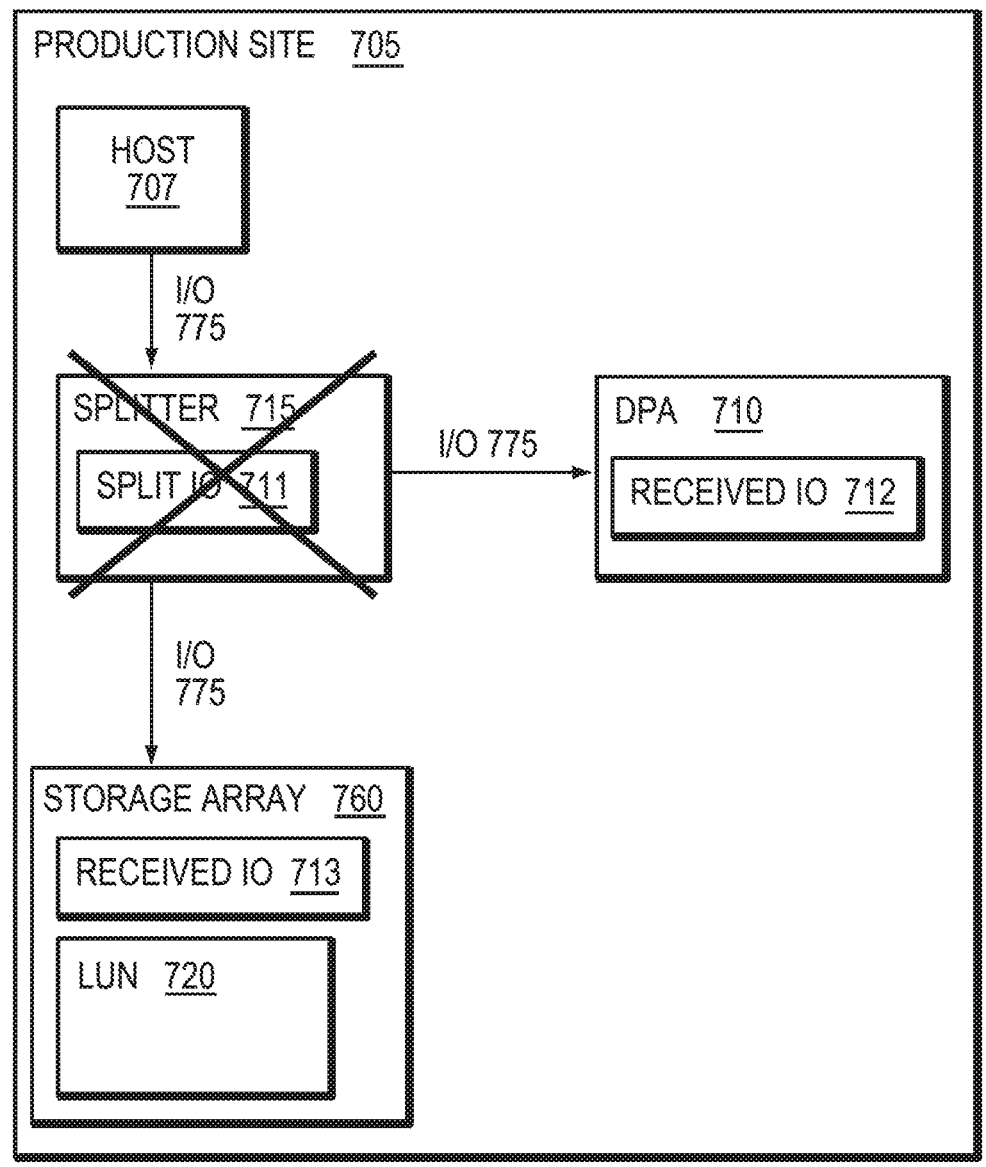
FIG. 7 is an alternative simplified illustration of recovering from a splitter failure in a data protection system, in accordance with an embodiment of the present disclosure.
Figure 8:
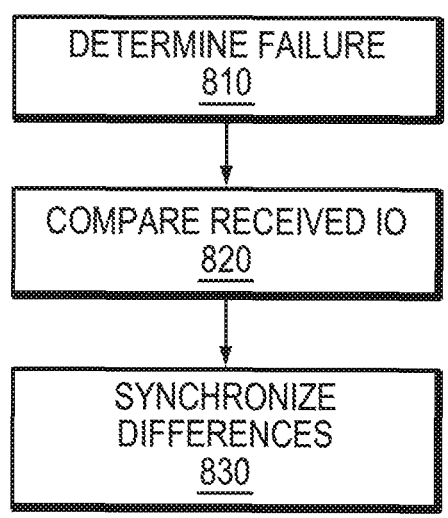
FIG. 8 is a simplified example of a method for recovering from a splitter failure, in accordance with an embodiment of the present disclosure.

Refer now to the example embodiments of FIGS. 7 and 8, which illustrate production site 705 and a crash of a splitter. In these embodiments splitter 715 has crashed and replication is paused. In these embodiments, it is desired to synchronize IO that has been received by LUN 720 and that has not been received by DPA 710. It is determined that splitter 715 has crashed (step 810). The marked IO in received IO 712 and 713 is compared to determine what IO was received by LUN 720 but was not received by DPA 710 (step 820), The IO determined to have been received by LUN 720 but not DPA 710 is synchronized by sending the IO from LUN 720 to DPA 710 (step 830). After LUN 720 and DPA 710 are synchronized and splitter 715 has been reinitialized, then replication may begin again.

Figure 9:
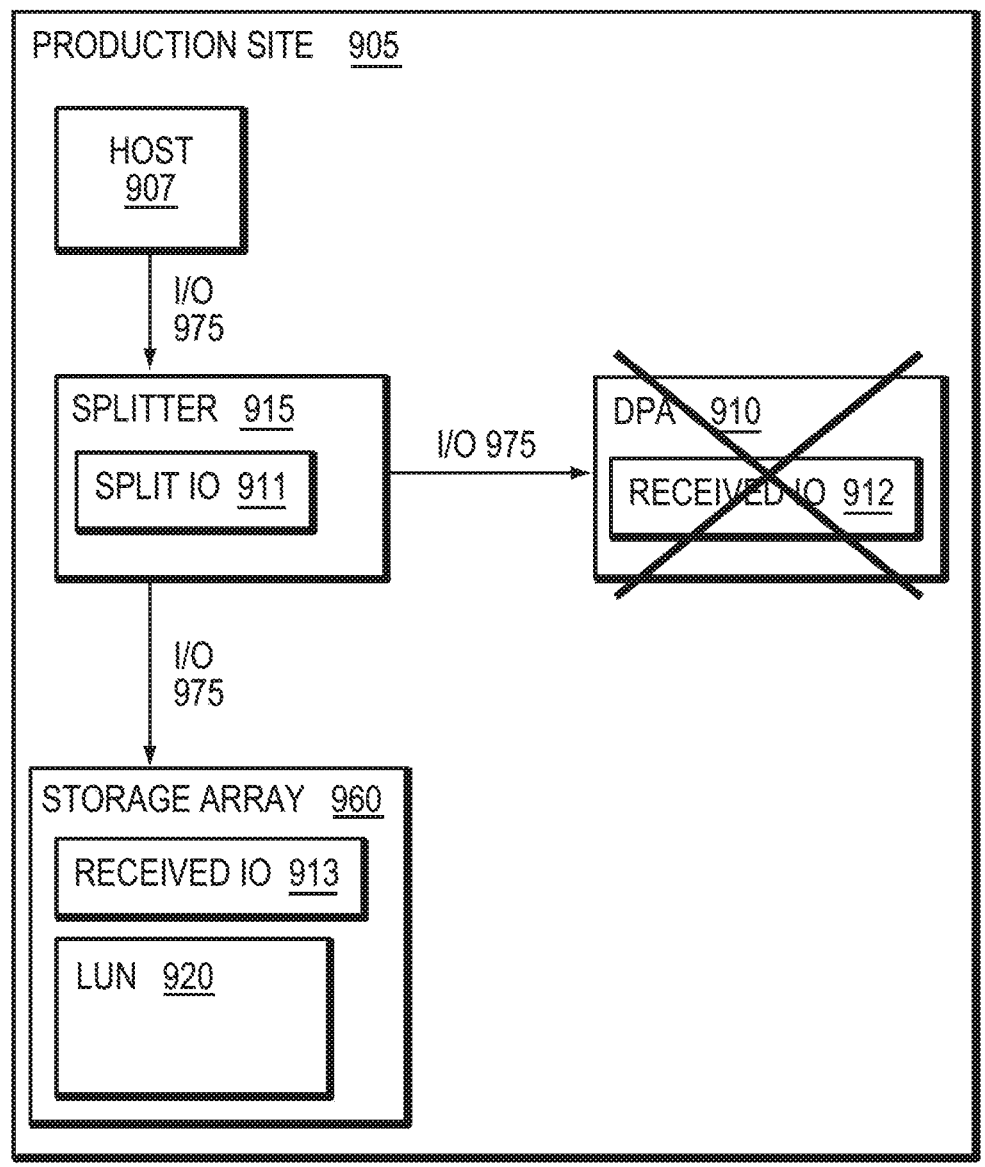
FIG. 9 is a simplified illustration of recovering from a data protection appliance failure in a data protection system, in accordance with an embodiment of the present disclosure.
Figure 10:
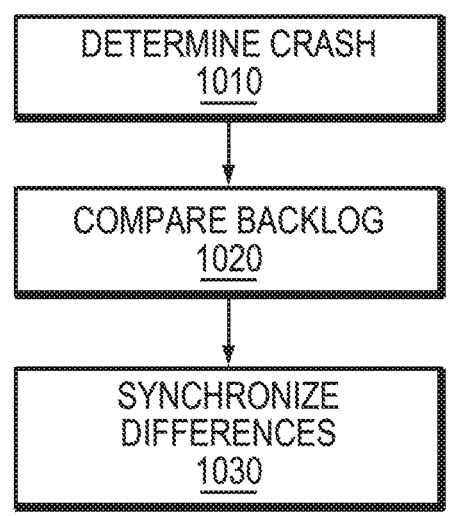
FIG. 10 is a simplified example of method for recovering from a data protection appliance failure, in accordance with an embodiment of the present disclosure.

Refer now the example embodiments of FIGS. 9 and 10, which illustrate a crash of a data protection appliance. In these embodiments, it is determined DPA 910 has crashed and replication has been paused (step 1010). In these embodiments it is necessary to determine what IO has been sent to LUN 920 but may not have been received by DPA 910 or may have been lost when DPA 910 crashed. When DPA 910 has reinitialized, Splitter 915 compares split IO 911, which tracks IO that has been split to LUN 920 and DPA 910 to the last know IO received by DPA 910 in received IO 912 (step 1020). IO marked as send to DPA 910 in split IO 911 but not marked as received in DPA 910 in received IO 912 is synchronized with DPA 910 (step 1030). After the IO has been synchronized, replication may be continued.

Figure 11:
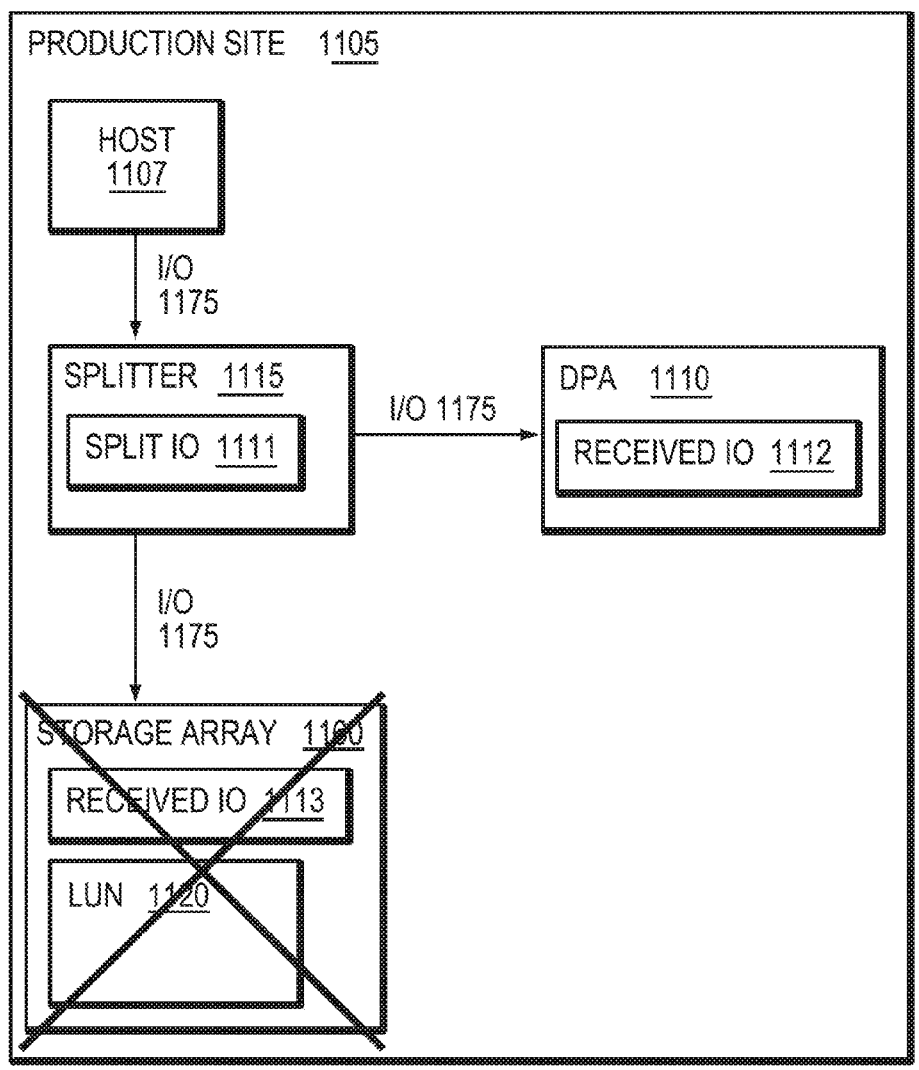
FIG. 11 is a simplified illustration of recovering from a storage array failure in a data protection system, in accordance with an embodiment of the present disclosure.
Figure 12:
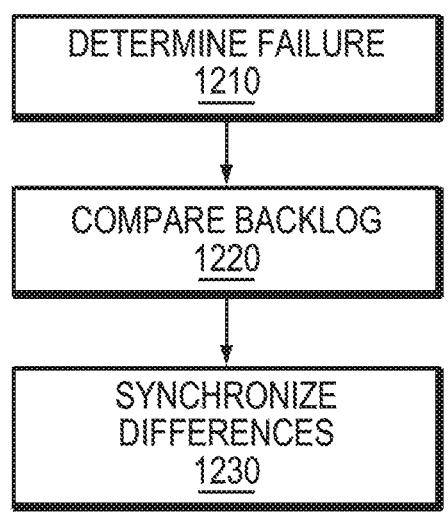
FIG. 12 is a simplified example of a method for recovering from a storage array failure, in accordance with an embodiment of the present disclosure.

Refer now the example embodiments of FIGS. 11 and 12, which illustrate a crash of a storage array. In these embodiments, it is determined the storage array with LUN 1120 has crashed and replication has been paused (step 1210). In these embodiments it is necessary to determine what IO has been sent to DPA 1110 but may not have been processed by LUN 1120 or may have been lost when LUN 1120 crashed. When the storage array with LUN 1120 has reinitialized, Splitter 1115 compares split IO 1111, which tracks IO that has been split to LUN 1120 and DPA 1110 to the last know IO received by LUN 1120 in received IO 1112 (step 1220). IO marked as send to LUN 1120 in split IO 1111 but not marked as received in LUN 1110 in received IO 1113 is synchronized with LUN 1120 (step 1230). After the IO has been synchronized, replication may continue. FIG. 11 illustrates host 1107, production site 1105, storage array 1160, and I/O 1175.

In some embodiments, a protocol between a DPA or vDPA, a splitter, and a storage array may periodically check IOs that have been acknowledged between the devices. In many embodiments, based on a periodic check of acknowledged IOs, the acknowledged IOs may be removed from a tracking structure in each device, such as a DPA or vDPA, splitter, and storage array. In most embodiments, this may ensure that a tracking structure or tracking backlog in each device does not become too large. In some embodiments, a protocol to check acknowledgements may run every 10 seconds. In many embodiments, a protocol to check acknowledgements may remove completed IOs from a backlog and a delta marker.

Figure 13:
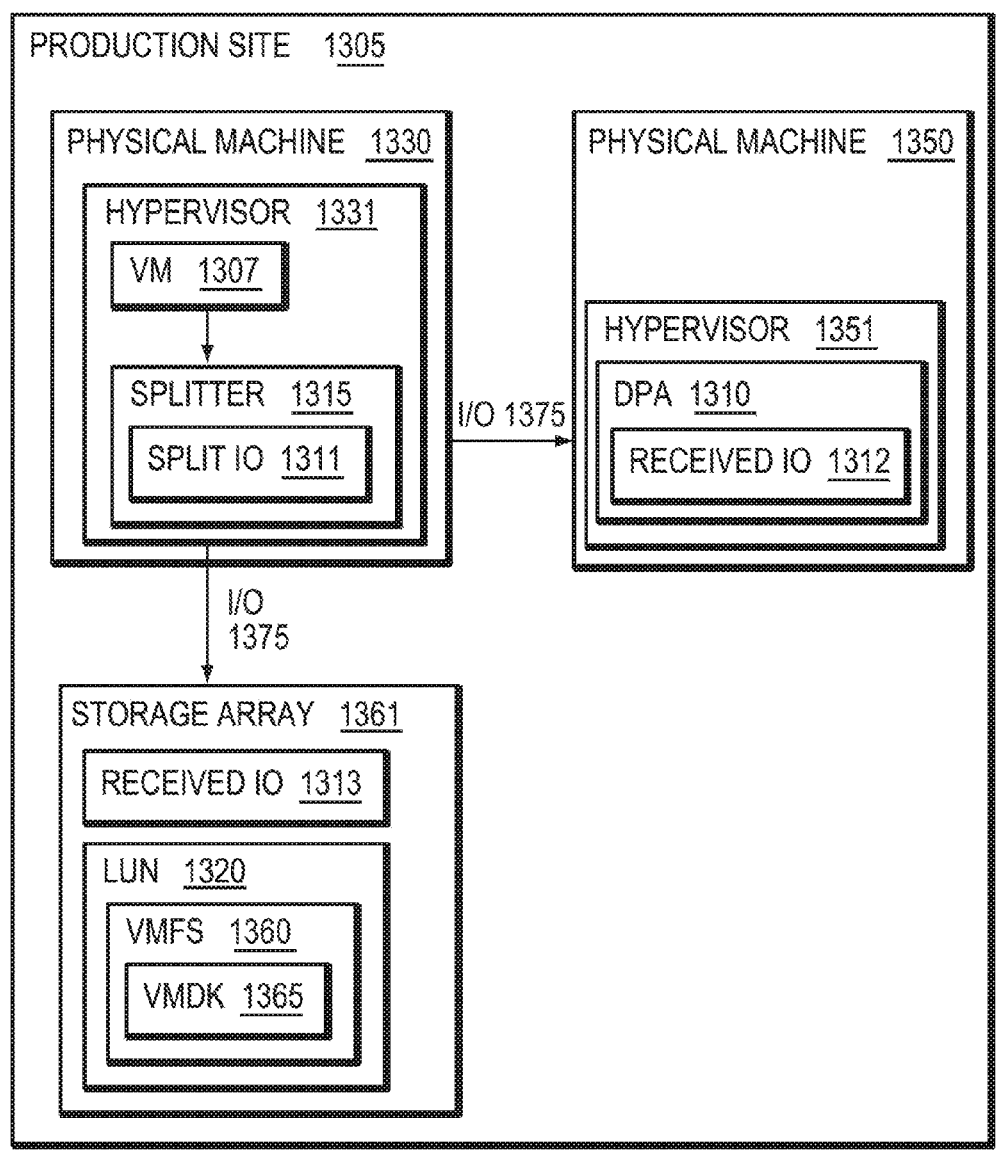
FIG. 13 is an alternative simplified illustration of a data protection system in a virtual environment, in accordance with an embodiment of the present disclosure.

Refer now to the example embodiment of FIG. 13. In the example embodiment of FIG. 13, production site 1305 has physical machine 1330, physical machine 1350, and storage array 1361. Hypervisor 1331 runs on physical machine 1330 and VM 1307 and splitter 1315 run on hypervisor 1331, VM 1307 has VMDK 1365 attached to it which is stored in VMFS 1360 which is stored on LUN 1320. Hypervisor 1351 runs on physical machine 1350 and vDPA 1310 runs on hypervisor 1351. IO 1375 from VM 1307 to VMDK 1365 are split by splitter 1315 and stored on VMDK 1365 in VMFS 1360, which is stored on LUN 1320 in storage array 1361. When IO arrives to storage array 1361, it arrives to LUN 1320, the storage is not aware that IO arrived to VMDK 1365 within VMFS 1365. In certain embodiments, additional information may be added to split IO to create a mapping between the IO replicated in the virtual replication environment and information stored on the storage array. FIG. 13 illustrates split IO 1311 and Received IO 1312.

Figure 14:
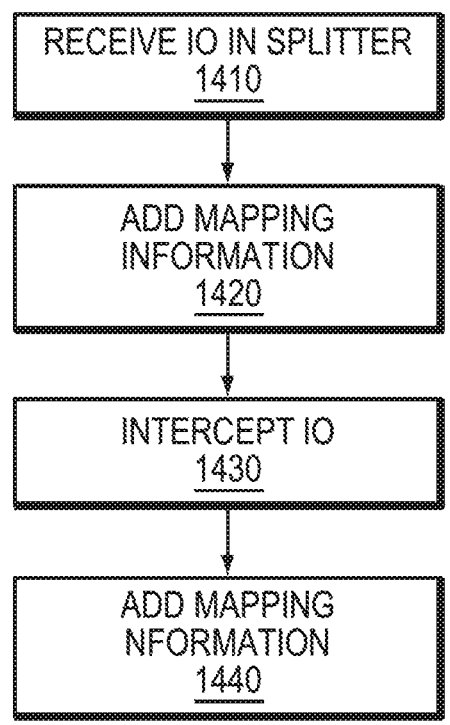
FIG. 14 is a simplified example of a method for adding mapping information, in accordance with an embodiment of the present disclosure.

Refer now as well to the example embodiment of FIG. 14. In these example embodiments, Splitter 1315 receives IO 1375 from VM 1307 (step 1410). Splitter 1315 adds mapping information to IO 1375 (step 1420). Storage array 1361 intercepts IO 1375 (step 1430). Storage array 360 adds mapping information to received IO 1313 to map the IO stored on LUN 1320 to VMDK 1365 (step 1440). In these embodiments, received IO 1313 contains information to allow storage array 1360 to understand that the IO is directed to VMDK as received IO 1313 contains metadata and offset information that map to VMDK 1365 in VMFS 1361. In this embodiment, when meta data of dirty locations is read from storage array 1361 the dirty locations within VMDK 1365 are received by splitter 1315.

Figure 15:
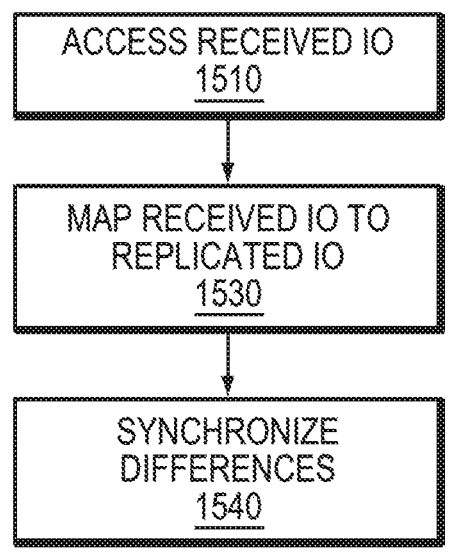
FIG. 15 is a simplified example of a method for mapping received IO to replicated IO, in accordance with an embodiment of the present disclosure.

Refer now to the example embodiments of FIGS. 13 and 15. In this embodiment splitter 1315 does not add any meta data to the IOs intercepted, and thus at storage array 1361 the dirty locations are kept as offset in LUN 1320. In this embodiment, when dirty locations are read, the reader such as splitter 1315 may need to parse the VMFS and map the dirty locations in LUN 1320 to dirty locations in VMDK 1365. FIG. 15 illustrates Access Received IO (step 1510), Map Received IO to Replicated IO (step 1530), and synchronize differences (step 1540).

In certain embodiments, the tracking structures in the splitter, the DPA, and the storage array may be periodically synchronized. In most embodiments, during synchronization portions of the tracking structures that have been confirmed to be replicated may be removed from the tracking structures.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Figure 16:
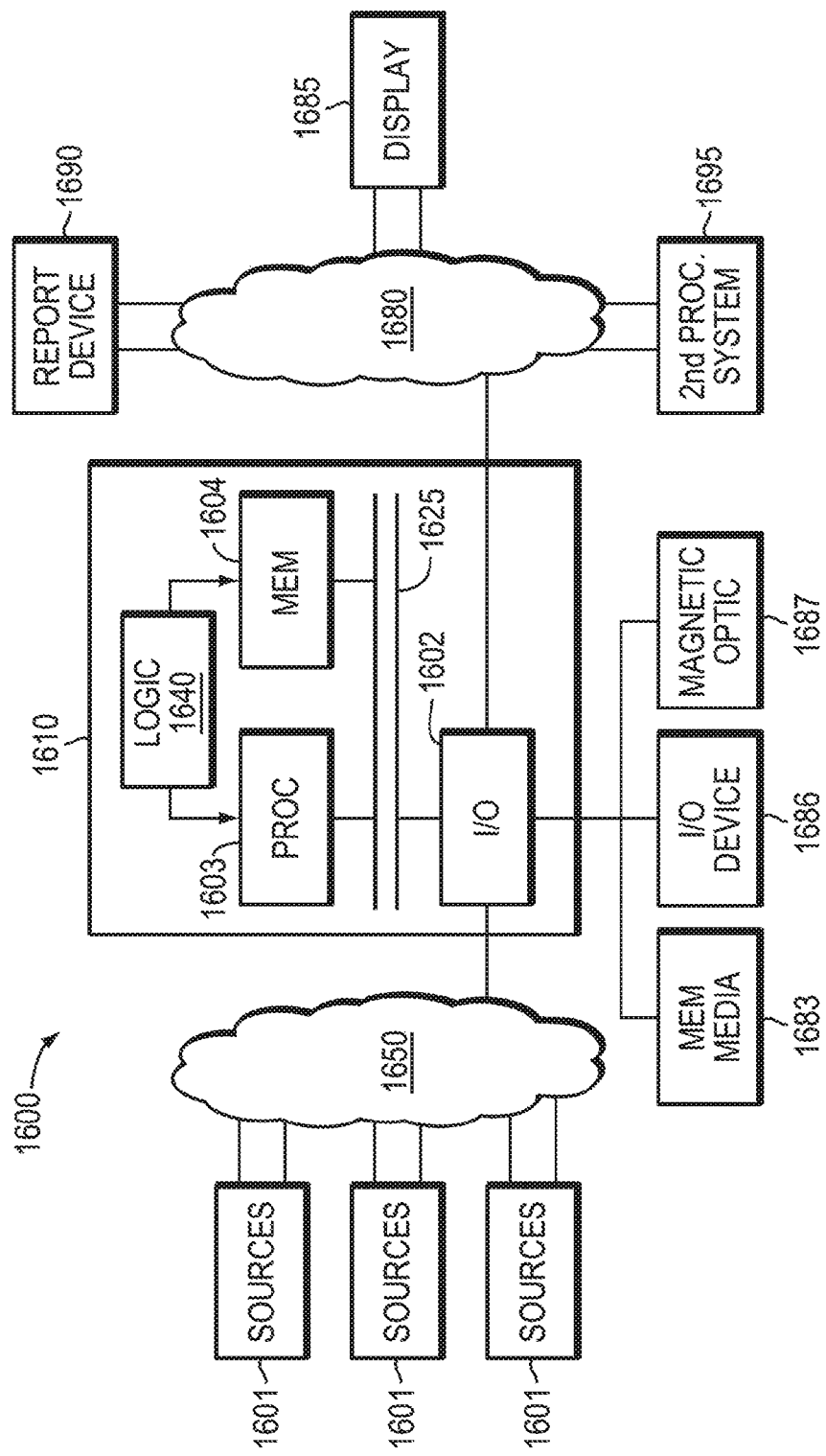
FIG. 16 is an example of an embodiment of an apparatus that may utilize the techniques described herein, in accordance with an embodiment of the present disclosure.
Figure 17:
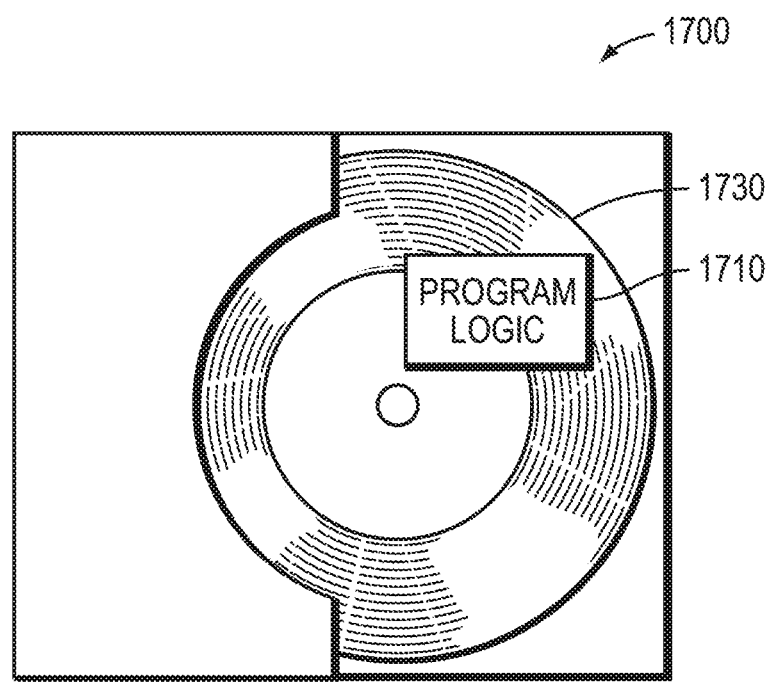
FIG. 17 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 16, the machine becomes an apparatus for practicing the invention. When implemented on one or more general-purpose processors, the program code combines with such a processor 1603 to provide a unique apparatus that operates analogously to specific logic circuits. As such a general purpose digital machine can be transformed into a special purpose digital machine. FIG. 17 shows Program Logic 1710 embodied on a computer-readable medium 1730 as shown, and wherein the Logic is encoded in computer-executable code configured for carrying out this invention and thereby forming a Computer Program Product 1700. The logic 1734 may be the same logic 1640 on memory 1604 loaded on processor 1603. The program logic may also be embodied in software modules, as modules, or as hardware modules. The processors or machines may be embodied as one or more virtual processors or machines, respectively. FIG. 16 illustrates computer 1600, sources 1601, I/O 1602, Memory 1604, processor, logic, memory, and IO 1610, connection 1625, cloud 1650, cloud 1680, mem media 1683, display 1685, I/O device 1686, Magnetic Optic 1687, report device 1690, and $2^{nd}$ processor system 1695.

The logic for carrying out the method may be embodied as part of the system described below, which is useful for carrying out a method described with reference to embodiments shown in, for example, FIGS. 4, 6, 8, 10, 12, 14, and 15.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A method for use in a replication environment comprising:
    intercepting an IO sent from a host to a storage device in a splitter; wherein the splitter has a split tracking structure;
    marking information about the IO in the split tracking structure;
    sending the IO to the storage device; wherein the storage device has a storage received tracking structure; wherein on successfully writing the IO the storage device marks the IO as received in the storage received tracking structure;
    sending the IO to a replication device (DPA); wherein the IO is sent to the storage device before confirming that the replication device has received the IO; wherein the DPA has a DPA received IO tracking structure; wherein upon successfully receiving the IO the DPA marks the IO as received in the DPA received IO tracking structure;
    determining that the splitter has crashed; and
    synchronizing locations between the replication appliance and the storage device to ensure that data sent to the storage device is replicated to the replication device by comparing IO marked in the DPA received IO tracking structure and IO marked in the Storage received IO tracking structure.

2. The method of claim 1 wherein the DPA acknowledges receipt of the IO to the splitter.

3. The method of claim 1 wherein the storage device acknowledges receipt of the IO to the splitter.

4. The method of claim 3 wherein entries on backlog in host backlog in array and backlog in DPA are erased periodically when IO is completed to both storage and replica targets.

5. The method of claim 1 wherein the host is running on a virtual machine sending IO to a virtual machine disk and the method further comprising:
    injecting, at the splitter, offset information about the virtual machine into split IO;
    using the offset information at the storage device to create a map between the virtual machine disk and the IO stored on the storage device to enable the storage device to track IO in the storage received tracking structure at a virtual machine level.

6. The method of claim 1 wherein the synchronization includes parsing IOs from the host to determine dirty location on the storage device.

7. The method of claim 1 the method further comprising:
    determining that the storage has crashed; and
    synchronizing locations between the replication appliance and the splitter device to ensure that data sent to the replication device is was processed by the storage device by comparing IO marked in the DPA received IO tracking structure and IO marked in the split tracking structure.

8. A system for data replication, the system comprising:
    a replication device; and
    computer-executable logic operating in memory, wherein the computer-executable program logic is configured for execution of:
    intercepting an IO sent from a host to a storage device in a splitter; wherein the splitter has a split tracking structure;
    marking information about the IO in the split tracking structure;
    sending the IO to the storage device; wherein the storage device has a storage received tracking structure; wherein on successfully writing the IO the storage device marks the IO as received in the storage received tracking structure;
    sending the IO to the replication device (DPA); wherein the IO is sent to the storage device before confirming that the replication device has received the IO; wherein the DPA has a DPA received IO tracking structure; wherein upon successfully receiving the IO the DPA marks the IO as received in the DPA received IO tracking structure;
    determining that the splitter has crashed; and
    synchronizing locations between the replication appliance and the storage device to ensure that data sent to the storage device is replicated to the replication device by comparing IO marked in the DPA received IO tracking structure and IO marked in the Storage received IO tracking structure.

9. The system of claim 8 wherein the DPA acknowledges receipt of the IO to the splitter.

10. The system of claim 9 wherein the host is running on a virtual machine sending IO to a virtual machine disk and the program logic further configured for:
   injecting, at the splitter, offset information about the virtual machine into split IO;
   using the offset information at the storage device to create a map between the virtual machine disk and the IO stored on the storage device to enable the storage device to track IO in the storage received tracking structure at a virtual machine level.

11. The system of claim 8 wherein the storage device acknowledges receipt of the IO to the splitter.

12. The system of claim 8 wherein the synchronization includes parsing IOs from the host to determine dirty location on the storage device.

13. A computer program product comprising:
   a non-transitory computer readable medium encoded with computer executable program code for replication of data, the code configured to enable the execution of:
      intercepting an IO sent from a host to a storage device in a splitter; wherein the splitter has a split tracking structure;
      marking information about the IO in the split tracking structure;
      sending the IO to the storage device; wherein the storage device has a storage received tracking structure; wherein on successfully writing the IO the storage device marks the IO as received in the storage received tracking structure;
      sending the IO to a replication device (DPA); wherein the IO is sent to the storage device before confirming that the replication device has received the IO; wherein the DPA has a DPA received IO tracking structure; wherein upon successfully receiving the IO the DPA marks the IO as received in the DPA received IO tracking structure;
      determining that the splitter has crashed; and
      synchronizing locations between the replication appliance and the storage device to ensure that data sent to the storage device is replicated to the replication device by comparing IO marked in the DPA received IO tracking structure and IO marked in the Storage received IO tracking structure.

14. The computer program product 13 wherein the DPA acknowledges receipt of the IO to the splitter.

15. The computer program product 13 wherein the storage device acknowledges receipt of the IO to the splitter.

16. The computer program product 13 wherein the host is running on a virtual machine sending IO to a virtual machine disk and the code further configured for:
   injecting, at the splitter, offset information about the virtual machine into split IO;
   using the offset information at the storage device to create a map between the virtual machine disk and the IO stored on the storage device to enable the storage device to track IO in the storage received tracking structure at a virtual machine level.

17. The computer program product 13 wherein the synchronization includes parsing IOs from the host to determine dirty location on the storage device.

* * * * *